US012662870B2

(12) United States Patent  
Hirsch et al.

(10) Patent No.: US 12,662,870 B2  
(45) Date of Patent: Jun. 23, 2026

(54) CONNECTING ELEMENT FOR INSULATED GLAZING WITH AN ELECTRICALLY CONDUCTIVE COATING AND/OR ELECTRICALLY CONTROLLABLE FUNCTIONAL ELEMENT

(71) Applicant: SAINT-GOBAIN GLASS FRANCE, Courbevoie (FR)

(72) Inventors: Michael Hirsch, Lakeville, MN (US); Francois Hermange, Aachen (DE); Bernhard Reul, Herzogenrath (DE)

(73) Assignee: SAINT GOBAIN GLASS FRANCE, Courbevoie (FR)

( * ) Notice: Subject to any disclaimer, the term of this patent is extended or adjusted under 35 U.S.C. 154(b) by 345 days.

(21) Appl. No.: 18/547,535

(22) PCT Filed: Feb. 22, 2022

(86) PCT No.: PCT/EP2022/054394  
§ 371 (c)(1),  
(2) Date: Aug. 23, 2023

(87) PCT Pub. No.: WO2022/180032  
PCT Pub. Date: Sep. 1, 2022

(65) Prior Publication Data  
US 2024/0052688 A1　Feb. 15, 2024

(30) Foreign Application Priority Data

Feb. 26, 2021　(EP) ..................................... 21159468

(51) Int. Cl.  
*E06B 3/67*　　　(2006.01)  
*B23K 1/00*　　　(2006.01)  
(Continued)

(52) U.S. Cl.  
CPC .......... *E06B 3/6722* (2013.01); *B23K 1/0016* (2013.01); *B23K 1/206* (2013.01); (Continued)

(58) Field of Classification Search  
CPC ...... E06B 3/6722; E06B 3/66342; E06B 9/24; E06B 2009/2464; E06B 3/66314; (Continued)

(56) References Cited

U.S. PATENT DOCUMENTS

| | | | |
|---|---|---|---|
| 2010/0294566 A1* | 11/2010 | Reul ........................ | H05B 3/84 174/94 R |
| 2022/0219254 A1* | 7/2022 | Bronstein ......... | B32B 17/10036 |
| 2023/0299517 A1* | 9/2023 | Christman ............. | H01R 12/53 174/250 |

FOREIGN PATENT DOCUMENTS

| | | |
|---|---|---|
| CN | 101897232 A | 11/2010 |
| CN | 110999534 A | 4/2020 |

(Continued)

OTHER PUBLICATIONS

International Search Report as issued in International Patent Application No. PCT/EP2022/054394, dated May 31, 2022.

(Continued)

*Primary Examiner* — Mariam Qureshi  
(74) *Attorney, Agent, or Firm* — CUSHMAN PARTNERS, LLC

(57) ABSTRACT

A connecting element, in particular for contacting an electrically conductive coating and/or an electrically controllable functional element in an insulated glazing, includes at least one flat conductor, which is arranged on a first side of an electrically insulating carrier film, and the flat conductor has at least one first connection region with at least one first solder deposit and at least one second connection region with at least one second solder deposit, and at least one (Continued)

Figure 1A:
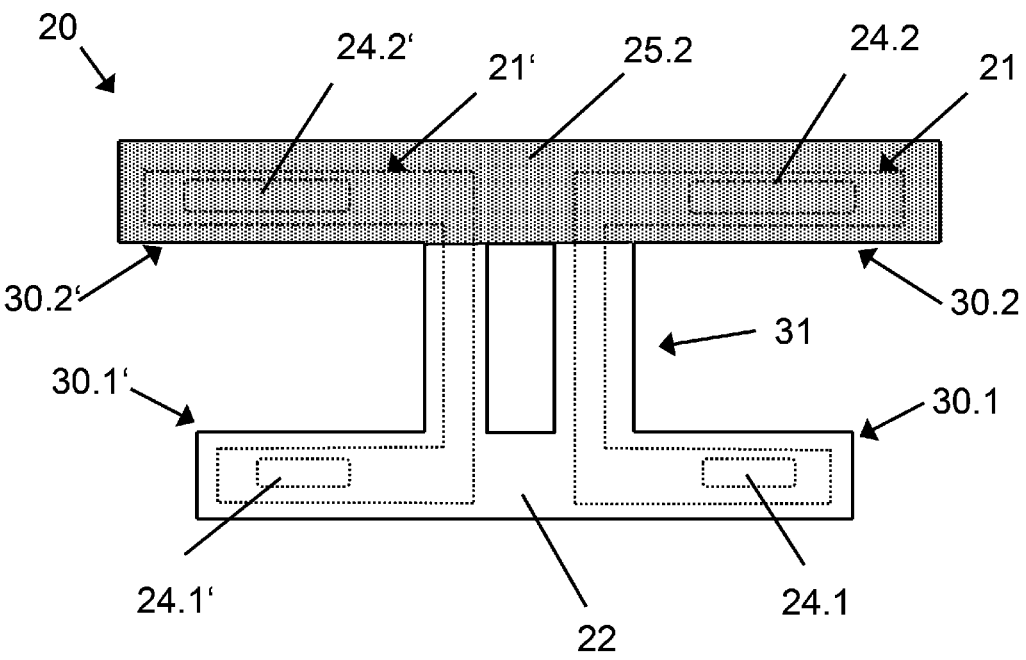

second adhesive layer, which is arranged below and/or next to the second connection region on a second side of the carrier film facing away from the first side.

18 Claims, 10 Drawing Sheets

(51) Int. Cl.

| | |
|---|---|
| *B23K 1/20* | (2006.01) |
| *G02F 1/153* | (2006.01) |
| *H01R 4/02* | (2006.01) |
| *E06B 3/663* | (2006.01) |
| *E06B 9/24* | (2006.01) |
| *H01R 4/70* | (2006.01) |

(52) U.S. Cl.
CPC .............. *G02F 1/153* (2013.01); *H01R 4/02* (2013.01); *E06B 3/66342* (2013.01); *E06B 9/24* (2013.01); *E06B 2009/2464* (2013.01); *H01R 4/70* (2013.01)

(58) Field of Classification Search
CPC ....... B23K 1/0016; B23K 1/206; G02F 1/153; H01R 4/02; H01R 4/70
See application file for complete search history.

(56) References Cited

FOREIGN PATENT DOCUMENTS

| | | |
|---|---|---|
| CN | 112352087 A | 2/2021 |
| DE | 10 2007 059818 B3 | 4/2009 |
| WO | WO 2019/055306 A1 | 3/2019 |
| WO | WO 2020/001977 A1 | 1/2020 |
| WO | WO 2020/007638 A1 | 1/2020 |

OTHER PUBLICATIONS

First Office Action as issued in Chinese Patent Application No. 202280017339.5, Issued on Aug. 13, 2025.

* cited by examiner

CONNECTING ELEMENT FOR INSULATED GLAZING WITH AN ELECTRICALLY CONDUCTIVE COATING AND/OR ELECTRICALLY CONTROLLABLE FUNCTIONAL ELEMENT

CROSS-REFERENCE TO RELATED APPLICATIONS

This application is the U.S. National Stage of PCT/EP2022/054394, filed Feb. 22, 2022, which in turn claims priority to European patent application number 21159468.4 filed Feb. 26, 2021. The content of these applications are incorporated herein by reference in their entireties.

The invention relates to a connecting element for an insulated glazing, which comprises in particular an electrically conductive coating and/or an electrically controllable functional element, an insulated glazing with a connecting element and a method for soldering the connecting element.

Insulated glazings are increasingly installed in glass facades on buildings for aesthetic reasons, particularly when the façade is optically designed as a whole glass façade. An insulated glazing of this kind consists of at least two panes, which are held at a distance from one another by a spacer. The panes can have a heat protection and/or sun protection coating. Such coatings can also contain silver and thus enable low transmission of infrared radiation. As a result, the temperature in the interior of a building can be reduced. In addition to the important property of thermal insulation, functional along with optical and aesthetic features also play an important role in the field of building glazing.

In recent years, glazings with electrochromic properties or those with electrically controllable liquid crystal layers for controlling light transmission, as are known, for example, from WO 2020/007638 A1, have found increasing use. An insulated glazing with an electrochromic coating requires an electrical connection and a busbar. A problem that is associated with the busbars present in insulated glazings is that the busbars are generally located in the glazing interior space and are visible both from the outside and the inside, thereby reducing the visible region of the window and, moreover, being unsightly from an aesthetic perspective.

A non-transparent coating, which is usually applied to a pane by screen printing, or an opaque component which is attached to a pane in order thus to conceal the busbar, is known. The aesthetic benefit is quite limited, because relatively large regions of the pane have to be provided with the opaque coating or component in order to achieve a suitable covering of the busbars when viewed from the outside, which excessively restricts the visible region of the insulated glazing. For production reasons, moreover, the opaque coating or component and the busbars have different colors, which, for aesthetic reasons, is also not desirable when viewed from the inside. Furthermore, the busbars in the insulated glazing are generally only concealed from the outside. However, when viewed from the inside of a space, the busbars and the solder area are visible, which is also detrimental to aesthetics.

Busbars according to the prior art are generally formed as bands or wires. The busbars consist of an electrically conductive material, such as silver or copper. They can be produced, for example, by printing a conductive silver paste on the electrically conductive and/or electrically switchable coating for electrical contacting. The burnt-in conductive silver paste contains silver particles. If the silver paste is burnt in, damage such as a short circuit between the surface electrodes of the electrochromic coating should be avoided.

Electrical connecting elements for glazings and in particular for vehicle glazings according to the prior art are known, for example, from DE 10 2007 059 818 B3 or WO 2020/001977 A1.

The object of the invention is to provide an improved connecting element with which improved insulated glazing can be produced easily and cost-effectively subject to aesthetic and in particular also functional aspects.

The object of the present invention is achieved according to the invention by a connecting element for an insulated glazing according to claim 1. Preferred embodiments are apparent from the dependent claims.

The connecting element according to the invention, in particular for contacting an electrically conductive coating and/or an electrically controllable functional element in an insulated glazing, comprises at least:

at least one flat conductor, which is arranged at least in portions and in particular completely on a first side of an electrically insulating carrier film, and the flat conductor has at least one first connection region with at least one first solder deposit and at least one second connection region with at least one second solder deposit, and at least one second adhesive layer, which is arranged below and/or next to the second connection region on a second side of the carrier film facing away from the first side.

Here, "below" means in the covering region, i.e., in a view through or in orthogonal projection on or through the carrier film.

The term "connection region" preferably describes the surface of the flat conductor under the respective solder deposit and the directly adjacent exposed region (i.e., located without coverage by the covering and/or other layers) for soldering. It can also be referred to as a contact region or soldering region.

In an advantageous embodiment of a connecting element according to the invention, the flat conductor is a film which preferably contains or consists of a metal, particularly preferably copper, tin and/or silver and in particular tin-plated copper. The film preferably has a thickness of 50 μm to 200 μm, and in particular of 80 μm to 120 μm.

The flat conductor is advantageously arranged completely on the carrier film, i.e., it does not protrude beyond it. This protects the flat conductor from damage particularly well.

The flat conductor electrically and preferably galvanically connects at least one first connection region to at least one second connection region.

The flat conductor is preferably fixedly connected to the carrier film, for example by gluing or directly applying a metal foil as a metal layer to the carrier film, for example by vapor deposition or sputtering.

In an advantageous embodiment of a connecting element according to the invention, the carrier film is an electrically insulating film, preferably a polymer film and in particular a film which contains or consists of polyimide. The thickness of the carrier film is preferably from 50 μm to 300 μm, particularly preferably from 100 μm to 200 μm and in particular from 150 μm to 160 μm. The carrier film is preferably opaque, i.e., substantially opaque and particularly preferably black.

Polyimide is particularly suitable as a carrier film, because it has a high temperature resistance of, for example, more than 400° C., is flame resistant and does not melt.

Opacity here and hereinafter generally refer, on the other hand, to transparency. In other words, the corresponding film or layer has lack of transparency. It is opaque, cloudy or dark, in particular black.

In a further advantageous embodiment of a connecting element according to the invention, at least one first adhesive layer is arranged around the first connection region on the first side of the carrier film and preferably at least in portions around the first solder deposit. In the region of the flat conductor, the flat conductor is then arranged between carrier film and first adhesive layer. This serves in particular for the secure positioning of the connecting element at the location of soldering. Furthermore, the adhesive layer prevents detachment of the carrier film in the vicinity of the solder joint.

The adhesive layer can, for example, contain or consist of a layer of an adhesive or a double-sided adhesive tape.

In a further advantageous embodiment of a connecting element according to the invention, a cover film is arranged at least in portions and preferably completely up to the first and the second connection region and particularly preferably up to the solder deposits on the first side of the carrier film. In the region of the flat conductor, the flat conductor is then arranged between the carrier film and the cover film.

In an advantageous embodiment of a connecting element according to the invention, the cover film is an electrically insulating film, preferably a polymer film and in particular a film which contains or consists of polyimide. The thickness of the cover film is preferably from preferably from 50 μm to 300 μm, particularly preferably from 100 μm to 200 μm, and in particular from 150 μm to 160 μm. The cover film is preferably opaque, i.e., substantially opaque and particularly preferably black.

Polyimide is particularly suitable as a cover film, because it has a high temperature resistance of, for example, more than 400° C., is flame resistant and does not melt.

In an advantageous embodiment of a connecting element according to the invention, the total thickness of all the films and layers is less than or equal to 350 μm and in particular less than or equal to 260 μm. This makes it possible to achieve particularly high gas tightness during installation in an insulated glazing and in particular a special argon tightness.

Advantageously, the first adhesive layer and the covering have, adjacent to the first solder deposit, at least one recess, which preferably extends up to the edge of the carrier film. The recess has the particular advantage that solder from the solder deposits can deflect into the region of the recess during the soldering process, so that an optimal thickness of the solder connection can be established. Furthermore, outgassing from the solder, the adhesive or the busbar to be soldered can escape and flow off. This outgassing can be partially very aggressive and destroy the sensitive layers of an electrically conductive coating or an electrically controllable functional element or impair their visual appearance.

Usually, the busbars to be contacted and thus also first connection regions are arranged on the edge of a laminar coating. The recesses are advantageously positioned in such a way that they point away from the laminar coating, so that exiting soldering tin or other "splatter" or damage to the laminar coating occurs in the non-visible region.

The cover film and/or the adhesive layers are preferably opaque, i.e., substantially opaque and particularly preferably black.

In a further advantageous embodiment, the carrier film according to the invention has a U-shaped contour, wherein, in each case, a connection region is arranged on a leg of the U-shaped contour.

In a further advantageous embodiment of a connecting element according to the invention, two flat conductors are arranged on a (common) carrier film.

In a further advantageous embodiment, the carrier film according to the invention has a double-T-shaped contour, wherein, in each case, a connection region is arranged on a leg of the double-T-shaped contour. This is particularly advantageous in the case of a carrier film having two flat conductors, because the connection regions can be connected via a merely narrow connection region.

In a further advantageous embodiment, the carrier film according to the invention is formed in the first connection region and/or the second connection region in each case in a strip-shaped manner and the strips are preferably arranged parallel to one another and in particular the parallel strips are connected to one another by at least one connection region extending substantially orthogonally.

In an advantageous development, at least one sealing element, preferably a rectangular sealing element, is arranged on the connection region, which sealing element particularly preferably contains or consists of polyisobutylene. The sealing element can preferably be arranged on one side or two sealing elements can be arranged on both sides on the carrier film.

It is understood that one or each flat conductor can also have two or more solder deposits on their respective (first or second) connection regions, for example to generate a redundancy in the contacting and thereby reduce failure rates, for example in the solder connection.

The dimensions of the carrier film, optionally of the covering film and the flat conductor can be adapted to the respective conditions of the respective arrangement. Preferably, the width of the carrier film, the covering film, and in particular the flat conductor is matched to the width of the busbars and in particular to the conductor track thereof. The lengths of the carrier film, the covering film and the flat conductor are preferably adapted to the distance to be bridged between the busbars, and the length of the connection region to the distance of the busbars from the outer surface of the spacer in an insulated glazing according to the invention.

In a further advantageous embodiment, the individual legs of the carrier film have a width of 1 mm to 10 mm, preferably 2 mm to 5 mm and/or a length of 30 mm to 200 mm, preferably 40 mm to 100 mm.

In a further advantageous embodiment, the flat conductors, preferably in the region of the individual legs, have a width of 1 mm to 10 mm, preferably 2 mm to 5 mm and/or a length of 30 mm to 200 mm, preferably 50 mm to 100 mm. Advantageously, the flat conductors are narrower than the carrier film, so that the carrier film has, at least in portions or completely, a projection over the flat conductor with a width of 0.1 mm to 2 mm and in particular 0.2 mm to 0.5 mm.

Such widths of the flat conductors are particularly suitable for achieving a sufficient current-carrying capacity in conjunction with the aforementioned thicknesses.

The solder deposits can have any shapes. The area of the solder deposits and thus their length and width, along with their thickness, can be selected such that a required mechanical strength of the solder connection results. The width of the solder deposit is advantageously matched to the width of the busbars and in particular the conductor track thereof. By varying the length of the solder connection, the mechanical tensile load capacity of the solder connection can be set.

Different materials of solder, flat conductor and conductor track of the busbars and the parameters of the soldering process have an influence on the tensile strength and mechanical strength of the solder connection. A suitable solder area and solder quantity for achieving a certain tensile strength can be determined in the context of simple experiment for the respective application.

Strip-shaped solder deposits having a length of 5 mm to 30 mm, preferably of 9 mm to 20 mm and in particular of 10 mm to 15 mm and/or a width of 0.5 mm to 5 mm, preferably of 0.5 mm to 3 mm, and in particular of 0.7 mm to 2.5 mm are preferred.

It is understood that the length, width and thickness of the carrier film, the flat conductor and the solder deposits can be adapted to the requirement of the respective individual case.

In an advantageous development, a strain relief is arranged in the connecting element and in particular in the connection region, for example in the form of a U-shaped or V-shaped folding of the carrier film together with the flat conductor and in some cases the covering layer.

A further aspect of the invention comprises a connection system, comprising at least a connecting element according to the invention, at least one busbar, which comprises or consists of an electrically conductive adhesive tape, and the electrically conductive adhesive tape comprises or consists of an electrically conductive adhesive layer, a conductor track and an opaque electrically insulating covering, wherein the connecting element according to the invention is connected, at least in portions, to the busbar via the adhesive layer and in particular is glued, and the at least one flat conductor of the connecting element is electrically conductively, preferably galvanically, connected to the busbar via a solder connection in at least the first connection region.

A further aspect of the invention relates to an insulated glazing with the connecting element according to the invention. The insulated glazing according to the invention comprises at least two panes and at least one spacer, which has two pane contact surfaces that run parallel to one another. A first pane contact surface is connected via a sealing means to a first pane of the two panes and a second pane contact surface is connected to the second pane via a sealing means, so that a glazing interior space and a glazing exterior space are formed. One of the two panes is provided at least partially with an electrically conductive coating and/or an electrically controllable functional element on the side facing the glazing interior space. Two busbars are provided for electrically contacting the electrically conductive coating and/or the electrically controllable functional element.

Furthermore, the insulated glazing according to the invention comprises at least one connecting element according to the invention, wherein the at least one flat conductor of the connecting element is soldered to the busbar in the first connection region, the connecting element between the spacer and the first pane is guided out of the glazing interior space and on the side II of the carrier film facing away from the second connection region, the connecting element is connected via the second adhesive layer to an outer surface of the spacer and is preferably glued.

Advantageously, at least one busbar comprises an electrically conductive adhesive tape, wherein the electrically conductive adhesive tape has an electrically conductive adhesive layer, a conductor track and an opaque, electrically insulating covering. The busbars are preferably formed in a strip shape.

The insulated glazing according to the invention makes it possible to achieve a significant improvement in the aesthetic appearance of the insulated glazing over the prior art, because the conductor track of the busbar is covered by the covering and, in particular when viewed from the inside of a space, is less visible.

The invention provides several advantages. On the one hand, considerable costs can be saved by the use of an electrically conductive adhesive tape. In addition, by the adhesive bonding of the adhesive tape on the electrically conductive coating and/or the electrically controllable functional element, it can be prevented that a short circuit between the electrode layers of the functional element is produced by burning-in busbars on the functional element.

The electrically conductive adhesive tape is connected to the electrically conductive coating and/or the electrically controllable functional element via the electrically conductive adhesive layer. The electrically conductive adhesive layer contains at least one electrically conductive material, preferably a metallic material, for example nickel, gold or aluminum. The adhesive layer is preferably silver-free, because this improves the compatibility with the preferably used electrode layers. It is also possible for the electrically conductive adhesive layer to contain a non-metallic electrically conductive material, for example graphite or carbon. The at least one electrically conductive material can be introduced into an electrically non-conductive adhesive matrix, for example epoxy resin. The at least one electrically conductive material is contained in such an amount in the adhesive layer that a desired current-carrying capacity is achieved. Preferably, the at least one electrically conductive material is contained in the adhesive layer with a mass fraction of at least 70%.

The adhesive of the adhesive layer is advantageously a heat-activatable adhesive, the activation temperature of which is preferably from 130° C. to 250° C., particularly preferably from 130° C. to 180° C. and in particular from 160° C. to 180° C. or from 180° C. to 250° C. Advantageously, the adhesive of the adhesive layer, for example during the soldering process, may be exposed to a maximum temperature of less than 300° C., preferably less than 250° C. and in particular less than or equal to 230° C. At such low temperatures, no impairment of the adhesive layer with respect to the electrical conductivity, the adhesive strength or bubble formation takes place.

The conductor track of the adhesive tape is an electrical conductor, whose width is significantly greater than its thickness. The conductor track is preferably so thin (i.e., the thickness is so small) that it is flexible and bendable. In an advantageous embodiment of the adhesive tape, the conductor track consists of a strip-shaped or belt-shaped metal foil. For example, the conductor track contains copper, aluminum, tin, gold or silver. The conductor track can also contain or consist of alloys with the aforementioned metals.

In an advantageous embodiment of the adhesive tape according to the invention, the opaque electrically insulating covering contains polyimide or consists thereof. The electrically conductive adhesive tape has a thickness of 50 μm to 1 mm, preferably 110 μm. For example, the adhesive tape can be 80 μm to 120 μm thick and the adhesive layer can have a thickness of 25 μm and the conductor track has a thickness of 35 μm.

In a further advantageous embodiment, the electrically conductive adhesive tape has a width of 1 mm to 10 mm, preferably 2 mm to 4 mm. Such widths are particularly suitable for achieving a sufficient current-carrying capacity in conjunction with the aforementioned thicknesses. It is understood that the length, width and thickness of the adhesive tape can be adapted to the requirement of the respective individual case.

In a further advantageous embodiment, the opaque electrically insulating covering covers the conductor track of the electrically conductive adhesive tape almost completely. This results in the advantage that the conductor track is better protected from corrosion and contamination.

In an advantageous embodiment, the at least one busbar according to the invention has a recess in the opaque, electrically insulating covering in the soldering region.

Furthermore, a first busbar can extend along a first side edge of the electrical conductive coating and/or of the electrically controllable functional element and a second busbar along a second side edge of the electrical conductive coating and/or of the electrically controllable functional element. In a particularly preferred embodiment, the two busbars are arranged on opposite sides of the insulated glazing in the glazing exterior space. The busbars are preferably arranged such that they are arranged horizontally in the installed state of the insulated glazing. However, it is also possible for them to be arranged vertically in the installed state.

In a further embodiment, the busbar can also be routed around the corner, i.e., the busbar is located on two sides of the insulated glazing which are connected to one another. In this case, the busbar can also be designed to be interrupted, in particular in the case of large insulated glazings, and can be formed in two parts. The busbar then has two legs which are angled relative to one another and which are arranged at an angle, in particular an angle of less than 180°, preferably approximately 90°. At a corner of the insulated glazing, the legs can be electrically conductively connected to one another, for example, via an electrically conductive bridge element. For this purpose, the bridge element has an electrically conductive material, for example copper.

Alternatively to the connection via the bridge element, a first leg can at least partially overlap a second leg, wherein the first leg and the second leg are arranged at an angle to one another.

According to a further advantageous embodiment, the second leg has a connection region for electrically contacting the first leg with the second leg. For this purpose, the opaque electrically insulating covering of the second leg has a recess in the connection region. The recess forms a material-free passage up to the conductor track of the second leg. The recess is, for example, a rectangular, circular or oval opening of the opaque, electrically insulating covering, wherein it is understood that basically any shapes are possible. The recess has such a volume that the first leg of the busbar can be connected reliably and securely via the electrically conductive adhesive layer to the conductor track of the second leg. The connection region is advantageously flat and preferably consists of an uninsulated region of the second leg. Such flat connection regions are particularly suitable for contacting electrically conductive adhesive tapes, because they have a large area which can be brought into contact with the electrically conductive adhesive layer of the adhesive tape and thereby form a low-resistance electrical line connection.

In a further embodiment, the second leg has a first portion, a second portion and a fold with which the first portion and the second portion of the second leg are arranged at least partially one above the other. The first portion extends perpendicular to the second portion, and the adhesive layer of the second portion faces the glazing interior space. The second portion has a region in which the first busbar and the second busbar overlap, so that an electrically conductive connection is produced between the first and second legs of the busbar. The second portion thus has a contact region, which is provided for electrical contacting with the first leg, so that an electrically conductive connection is produced between the first leg and the second leg.

The insulated glazing comprises at least two panes, which are held at a distance from one another by at least one spacer. A different designation for insulated glazing is multi-pane insulated glazing. The insulated glazing can, for example, be a two-pane insulated glazing, which comprises two panes, a three-pane insulated glazing which comprises three panes, or a four-pane insulated glazing which comprises four panes. The insulated glazing preferably comprises two or three panes.

From the at least two panes of the insulated glazing, two panes are outer panes, which are in contact with the external environment. From an outer pane, one side, the inner side or inside, faces a glazing interior space, and the other side, the outer side or outside, faces the external environment. In a preferred embodiment, an outer pane is a laminated glass composed of at least two individual panes, in particular the outer pane, which in the installed state points outward. If the insulated glazing comprises more than two panes, one or more panes, the inner panes, are arranged between the two outer panes. One side of an inner pane faces a glazing interior space, and the other side faces a different glazing interior space.

The insulated glazing according to the invention comprises at least one spacer, preferably one or two spacers. The spacer has two parallel pane contact surfaces. The spacers known from the prior art can be used as spacers.

Spacers that space two panes apart are common. These can generally be used for multi-pane insulated glazings, such as, for example, two-pane insulated glazings, three-pane insulated glazings and four-pane insulated glazings. Accordingly, two or three such spacers are required for three-pane insulated glazings and four-pane insulated glazings, a first spacer for spacing the one outer pane from the inner pane and a second spacer for spacing the other outer pane apart from the inner pane. Spacers which can space three panes apart from one another are also known.

In a preferred embodiment, the spacer has a glazing interior surface, which is connected to the two pane contact surfaces, and an outer surface which is connected directly or via connection surfaces to the two pane contact surfaces. The glazing interior surface faces the glazing interior space, while the outer surface, often also referred to as bonding surface, faces the glazing exterior space.

In a preferred embodiment, the outer surface is connected to the two pane contact surfaces via connection surfaces, i.e., via a connecting surface with a pane contact surface and/or via a different connecting surface with the other pane contact surface, wherein preferably both pane contact surfaces are connected to the outer surface via such connecting surfaces. The connecting surface can, for example, be at an angle in the range of 30° to 60° to the outer surface. The two pane contact surfaces are generally approximately perpendicular or perpendicular to the plane in which the outer surface is located and/or to the plane in which the glazing interior surface is located. As a rule, outer surface and glazing interior surface run parallel to one another. The glazing interior surface is generally connected directly to the two pane contact surfaces. However, the glazing interior surface can in some cases also be connected to the pane contact surfaces via connection surfaces.

The spacer in some cases can have one or more cavities in the interior, preferably a central cavity. Generally, drying agents are contained in the cavity or cavities. The glazing interior surface preferably has openings in order to facilitate the absorption of moisture by means of drying agents that in some cases are present in the spacer.

It is understood that the dimensions of the spacer depend on the dimensions of the insulated glazing. The width of the spacer can be, for example, in the range from 4 mm to 30 mm, preferably 8 mm to 16 mm. The height of the spacer can be, for example, in the range from 5 mm to 15 mm, preferably 5 mm to 10 mm. The width of a spacer is in reference to the direction from one side contact surface to the other side contact surface. The height refers to the direction from the outer surface to the glazing interior surface.

In the case of a three-pane insulated glazing, in an alternative embodiment, a spacer can be used which is suitable for the spacing of three panes. Such a spacer corresponds to a spacer as described above, except that a receiving device for a pane is additionally provided in the glazing interior surface. The receiving device for a pane can be designed, for example, in the form of a groove. If this type of spacer has one or more cavities containing drying agents in the interior, two cavities are preferably present, wherein a cavity is located on one side of the receiving device and the other cavity is located on the opposite side of the receiving device. As stated, two individual spacers for the spacing of two panes in each case can also be used for three-pane insulated glazings.

It is understood that the dimensions of the spacer that is suitable for the spacing of three panes depend on the dimensions of the insulated glazing. The width of such a spacer can be, for example, in the range from 10 mm to 50 mm, preferably 20 to 36 mm. The height can be, for example, in the range from 5 mm to 15 mm, preferably 5 mm to 10 mm.

The spacer which is inserted in the insulated glazing is formed, for example, from metal or a plastics material, wherein a plastics material is preferred. Examples of suitable metals are stainless steel and aluminum. Materials having lower thermal conductivity, so-called "warm edge" systems, are preferred as a plastics material. Plastics material spacers are also referred to as polymeric spacers.

Spacers formed from a plastics material may contain, for example, one or more polymers selected from polyethylene (PE), polycarbonate (PC), polypropylene (PP), polystyrene, polybutadiene, polynitrile, polyester, polyurethanes, polymethyl methacrylate, polyacrylate, polyimide, polyethylene terephthalate (PET), silicone, polybutylene terephthalate (PBT), acrylonitrile butadiene styrene (ABS), acrylic ester styrene-acrylonitrile (ASA), acrylonitrile butadiene styrene polycarbonate (ABS/PC), styrene-acrylonitrile (SAN), PET/PC, PBT/PC and/or copolymers thereof, wherein ABS, ASA, ABS/PC, SAN, PET/PC, PBT/PC and/or copolymers thereof are preferred.

The spacer, in particular those made of a plastics material, can in some cases contain one or more additives which are customary for such materials, for example drying agents, coloring agents, for example pigments or dyes, reinforcing materials, fillers, light stabilizers, stabilizers, release agents and the like. Drying agents can be contained in cavities or recesses of the spacer or in the plastics matrix of the spacer. Other additives are usually contained in the plastics matrix of the spacer. Examples for suitable drying agents are silica gels, molecular sieves, CaCl$_2$), Na$_2$SO$_4$, activated carbon, silicates, bentonites, zeolites and/or mixtures thereof.

The spacer can be transparent, but in a preferred embodiment it is not transparent, i.e., opaque. Customary colors for the spacer are, for example, black, white, brown, or gray, in particular when it is a spacer made of a plastics material. In the case of a spacer made of metal, the color usually results from the material used.

The panes of the insulated glazing can be made of organic glass or preferably of inorganic glass. In an advantageous embodiment of the insulated glazing according to the invention, the panes can, independently of one another, be made of flat glass, float glass, soda lime glass, quartz glass or borosilicate glass. The thickness of each pane can vary and thus be adapted to the requirements of the individual case. Preferably, panes having standard thicknesses from 1 mm to 19 mm and preferably from 2 mm to 8 mm are used. The panes can be colorless or colored. At least one pane can be designed as a textured glass.

The panes of the insulated glazing are, in particular, insulating glass panes, laminated glass panes or individual glass panes. A laminated glass pane can comprise at least two panes, which are connected to one another via an intermediate layer. The intermediate layer can preferably be a thermoplastic material such as polyvinyl butyral (PVB), ethylene vinyl acetate (EVA), polyurethane (PU) or a plurality of layers thereof, preferably having thicknesses of 0.3 mm to 0.9 mm.

The insulated glazing preferably comprises at least one pane, more preferably at least two panes, which, independently of one another, is or are a float glass pane, a laminated glass pane, textured glass or a colored or satinized glass. More preferably, at least one pane is a float glass pane.

The insulated glazing comprises at least one pane, which is at least partially provided with an electrically conductive coating and/or an electrically conductive functional element on the side facing the glazing interior space or a glazing interior space. The electrically conductive coating can in some cases be an electrically switchable coating. The electrically conductive functional element can in some cases be an electrically switchable functional element.

The electrically conductive coating or the electrically conductive functional element is generally provided on an inner side of one of the two outer panes or, if present, on one of the sides of an inner pane, wherein the electrically conductive coating or the electrically conductive functional element is preferably applied to an inner side of an outer pane. In a preferred embodiment, the outer pane, on the inner side of which the electrically conductive coating or the electrically conductive functional element is attached, is the outer pane, which points outward in the installed state, wherein the outer pane is preferably a laminated glass composed of at least two individual glasses.

Such an electrically conductive coating or such an electrically conductive functional element can, for example, act as illumination, heating or antenna or be used in an electrically switchable glazing such as displays or electrochromic glazing. Such a coating or a functional element of this kind can also be suitable for example for an alarm glass for an intrusion message or a glass for protection against electromagnetic radiation.

The electrically conductive coating or the electrically conductive functional element are preferably an electrochromic coating, a transparent, electrically conductive coating or one or more photovoltaic elements such as solar cells for electrical power generation, wherein an electrochromic coating is particularly preferred.

The electrochromic coating preferably comprises at least two electrode layers and two electrochemically active layers located between the two electrode layers, which layers are separated from one another by an electrolyte layer. The two active layers are in each case capable of reversibly storing small ions, wherein at least one of the two layers consists of an electrochromic material, which has different oxidation states that correspond to the loaded or offloaded state of the ions and have a different coloration. By applying electrical voltages of different polarity, the loading or offloading of the ions can be controlled in order thereby to influence the optical transmission of the coating in a targeted manner.

The transparent, electrically conductive coating can be permeable to electromagnetic radiation, preferably electromagnetic radiation having a wavelength of 300 nm to 1300 nm, in particular for visible light from 390 nm to 780 nm. "Permeable" means that the total transmission of the pane is preferably >70% and in particular >75% permeable, in particular for visible light.

The transparent, electrically conductive coating is preferably a functional coating, more preferably a coating with a sun protection effect. A coating with a sun protection effect has reflective properties in the infrared range. The transparent, electrically conductive coating can have particularly low emissivities (low E). This advantageously reduces heating of the interior of a building as a result of solar radiation. Panes provided with such a transparent, electrically conductive coating are commercially available and are referred to as low-E-glass (low-emissivity glass).

Such coatings typically contain at least one metal, in particular silver or an alloy containing silver. The transparent, electrically conductive coating can comprise a sequence of a plurality of individual layers, in particular at least one metallic layer and dielectric layers, which contain, for example, at least one metal oxide. The metal oxide preferably includes zinc oxide, tin oxide, indium oxide, titanium oxide, silicon oxide, aluminum oxide or the like, along with combinations of one or more thereof. The dielectric material can also contain silicon nitride, silicon carbide or aluminum nitride.

Particularly suitable transparent, electrically conductive coatings contain at least one metal, preferably silver, nickel, chromium, niobium, tin, titanium, copper, palladium, zinc, gold, cadmium, aluminum, silicon, tungsten or alloys thereof, and/or at least one metal oxide layer, preferably tin-doped indium oxide (ITO), aluminum-doped zinc oxide (AZO), fluorine-doped tin oxide (FTO, SnO2:F), antimony-doped tin oxide (ATO, SnO2:Sb), and/or carbon nanotubes and/or optically transparent, electrically conductive polymers, preferably poly(3,4-ethylenedioxythiophene), polystyrene sulfonate, poly(4,4-dioctylcyloptopithiophene), 2,3-dichloro-5,6-dicyano-1,4-benzoquinone, and mixtures and/or copolymers thereof.

The transparent, electrically conductive coating preferably has a layer thickness from 10 nm to 5 nm, and particularly preferably from 30 nm to 1 nm. The sheet resistance of the transparent, electrically conductive coating is, for example, 0.35 ohms/square to 200 ohms/square, preferably 0.6 ohms/square to 30 ohms/square, and in particular 2 ohms/square to 20 ohms/square.

The insulated glazing comprises at least two busbars, which are arranged on the electrically conductive coating and/or on the electrically conductive functional element and thus are in the electrical contact. The busbar is also referred to as a busbar assembly or as a bus bar.

The electrically conductive coating, in particular the electrochromic coating, or the electrically conductive functional element are thus electrically connected to the at least two busbars. In general, two busbars are provided on the electrically conductive coating or on the electrically conductive functional element.

In the insulated glazing according to the invention, a pane contact surface of a spacer is connected to a pane via a sealing means, and the other pane contact surface of the spacer is connected to another pane via a sealing means. In this way, at least one glazing interior space and at least one glazing exterior space are formed.

The glazing interior space is surrounded by the two panes, the spacer and the sealing means placed between the pane and the pane contact surface and represents a closed cavity. The glazing interior space can be filled with air or another gas, in particular a noble gas, such as argon or krypton. When a spacer is used which spaces three panes apart from one another as described above, two glazing interior spaces are formed, one between an outer pane and the inner pane and one between the other outer pane and the inner pane. The glazing interior surface of the spacer faces the glazing interior space.

The glazing exterior space is likewise formed by the two panes, the spacer and the sealing means placed between pane and pane contact surface, and is located opposite the glazing interior space in the outer edge region of the insulated glazing. The glazing exterior space is open on the side opposite the spacer. The outer surface of the spacer faces the glazing exterior space.

The panes, the sealing means placed between the pane and the pane contact surface, and the spacer delimit the glazing interior space from the glazing exterior space and belong neither to the glazing interior space nor to the glazing exterior space.

The sealing means for connecting the side contact surface of the spacer and the pane serves, on the one hand, for bonding the spacer to the pane and, on the other hand, for sealing the gap between the spacer and the pane. Suitable sealing means are based, for example, on butyl rubber, polyisobutylene (PIB), polyethylene vinyl alcohol, ethylene vinyl acetate, polyolefin rubber, copolymers and/or mixtures thereof.

The electrically conductive coating and/or the electrically conductive functional element can be arranged on the pane in the region of the glazing interior space over the entire surface or over part of the surface.

In accordance with the position of the electrically conductive coating or the electrically conductive functional element, the at least two busbars are generally connected to an inner side of one of the two outer panes or, if present, to one of the sides of an inner pane, wherein the busbars are preferably connected to an inner side of an outer pane. In the installed state of the insulated glazing, it can be the outer pane which faces the interior space or the outer pane which faces away from the interior space.

In the insulated glazing according to the invention, an outer seal is generally introduced as usual in the at least one glazing exterior space. The outer seal can directly adjoin the outer surface of the spacer or be connected thereto via a sealing means. The sealing means described above are suitable, for example, as intermediate sealing means. The outer seal usually fills the glazing exterior space over its entire width between the panes.

The outer seal preferably contains a polymer or a silane-modified polymer, particularly preferably organic polysulfides, silicones, silicone rubber—which can be room-temperature-crosslinked, high-temperature-crosslinked, peroxidically crosslinked and/or addition-crosslinked— polyurethanes and/or butyl rubber. Such substances have very good adhesion to glass, so that the outer seal serves primarily to bond the panes and contributes to the mechanical stability of the insulated glazing. In an optional embodiment, additives to increase aging resistance, for example UV stabilizers, can also be included.

The insulated glazing can comprise an opaque coating which is applied in the edge region of a pane, preferably on an outer side of the first pane. The opaque coating serves as flat vision protection element, which is applied in the edge region of a pane. The opaque coating can also be formed circumferentially on the edge region of the pane.

The insulated glazing according to the invention is particularly suitable as building interior glazing, building exterior glazing or façade glazing. The invention therefore also relates to the use of the insulated glazing according to the invention as building interior glazing, building exterior glazing or façade glazing.

A further aspect of the invention relates to a method for soldering a connecting element according to the invention with a busbar according to the invention (this corresponds to the production of a connection system according to the invention), wherein a) at least one busbar according to the invention is provided with an electrically conductive adhesive layer, a conductor track and an opaque, electrically insulating covering, b) the covering of the busbar is removed in a region to be soldered, and a portion of the busbar conductor track to be soldered is exposed, c) the first adhesive layer of the connecting element according to the invention is arranged on the busbar such that the first solder deposit is located directly above or in contact with the exposed portion of the busbar, d) at least one soldering element is applied to the second side of the carrier film and substantially congruent to the first solder deposit and the first solder deposit is heated so that a solder connection between the flat conductor and the busbar is formed.

The method according to the invention for soldering a connecting element according to the invention with a busbar according to the invention is preferably carried out in the order indicated above.

The soldering process in step d) is preferably carried out by means of a device for thermal soldering or for soldering according to the hot-stamp method. In this case, a heated soldering element (also called soldering tip or soldering punch) is brought to the soldering point, and the solder deposit is melted under the action of a controlled temperature and a controlled contact pressure. Alternatively, the soldering element can also only be brought to the corresponding temperature after contact with the solder deposit. Furthermore, the temperature and the contact pressure can also be varied continuously or stepwise or can be carried out in a pulsed manner.

In the method according to the invention, it is important that the soldering element is heated only via the carrier film, the underlying flat conductor, the solder deposit and the conductor track of the busbar. That is, the soldering element is not in direct contact with the flat conductor, solder deposit or conductor track of the busbar. This enables particularly gentle and controlled heating. Furthermore, after soldering, the solder joint is not visible from the outside, but is already covered by the opaque carrier film, so that the solder joint is not visible and is laminated well, which improves the visual aesthetic impression.

The electrically conductive adhesive layer preferably contains a heat-activatable adhesive.

The covering of the busbar can be done by any suitable methods, for example by mechanical removal or laser ablation.

In an advantageous embodiment of the method according to the invention, the temperature of the soldering tip is selected such that the adhesive layer of the busbar is heated below the point of the solder connection (short soldering point) to a maximum temperature of less than 300° C., preferably less than 250° C. and in particular less than or equal to 230° C.

It is preferred if a maximum temperature at the soldering element is used of less than or equal to 450° C., preferably less than or equal to 410° C. and in particular less than or equal to 350° C.

The flat conductor and the busbar, and in particular a tinned copper foil according to the invention as a conductor track in the flat conductor and in the busbar, conduct the heat of the soldering tip. A suitable solder tip temperature depends on, among other things, material and thickness of the flat conductor and the busbar along with material, thickness and coloration of the carrier film and the other films and layers in the vicinity of the solder connection and can be determined within the scope of simple experiments.

A further aspect of the invention comprises a method for producing an insulated glazing according to the invention, wherein at least e) method steps a) to d) are carried out according to the method according to the invention for soldering a connecting element, f) a spacer is placed on the first pane, wherein the connection region of the connecting element is arranged between a side face of the spacer and the first pane, g) the connecting element is bonded to the outer surface of the spacer via the second adhesive layer on the second side of the carrier film, and h) at least one external feed line is soldered to the flat conductor of the connecting element in the second connection region.

The method according to the invention for producing an insulated glazing according to the invention is preferably carried out in the order indicated above.

In an advantageous embodiment of the method according to the invention for producing an insulated glazing according to the invention, the method comprises arranging and connecting a second pane to the second side face of the spacer, preferably between steps f) and g) or between steps g) and h).

In a further advantageous embodiment, after step h) the insulated glazing is sealed with a seal in the glazing exterior space.

A further aspect of the invention comprises the use of a connecting element according to the invention or of the method according to the invention for soldering a connecting element according to the invention for electrical contacting of a busbar, which connecting element is bonded and electrically conductively connected to an electrically conductive coating and/or an electrically controllable functional element by means of an electrically conductive, heat-activatable adhesive.

Figure 1B:
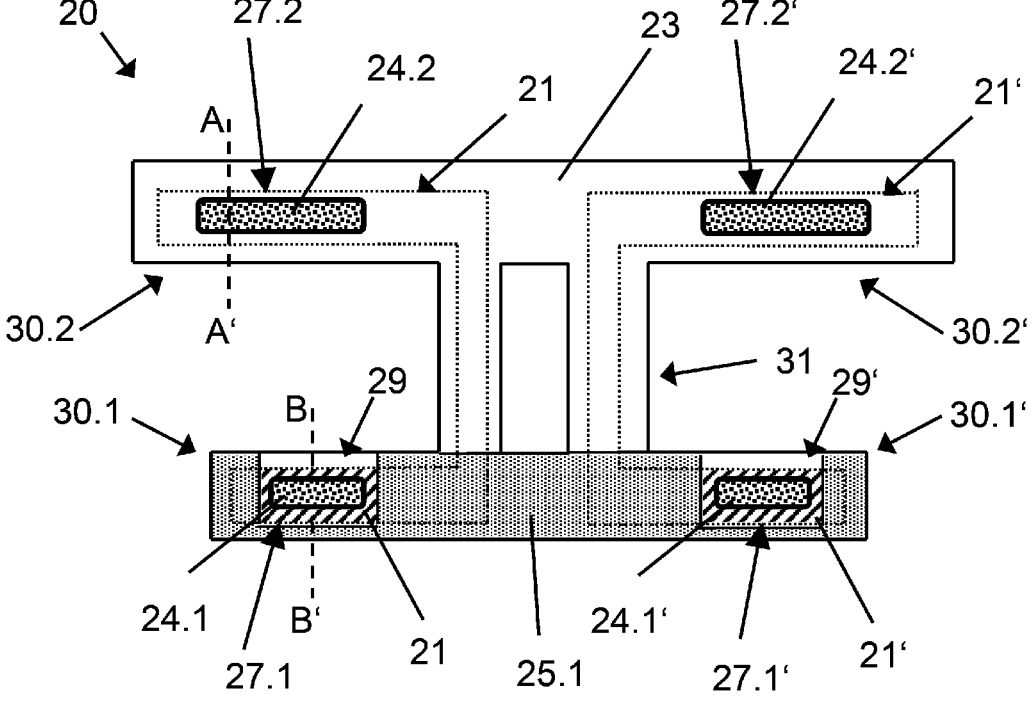
Figure 1C:
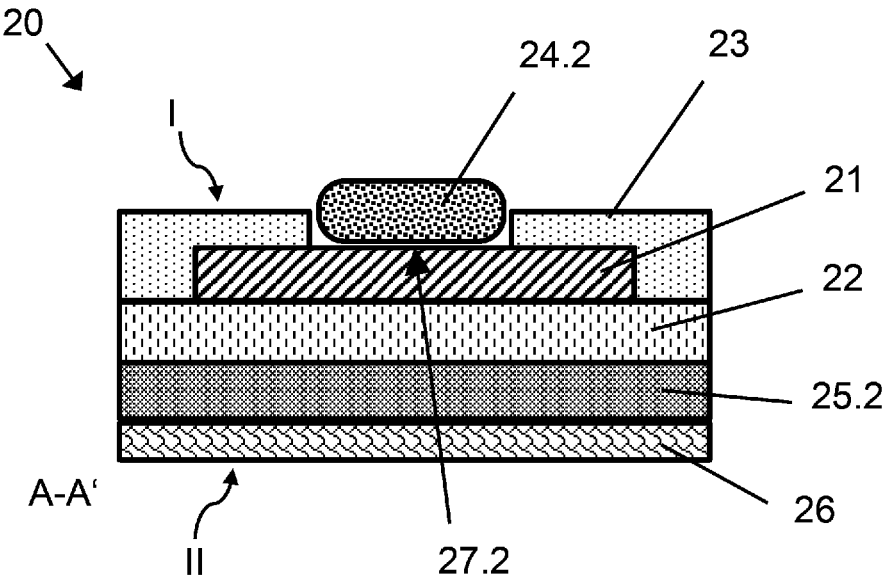
Figure 1D:
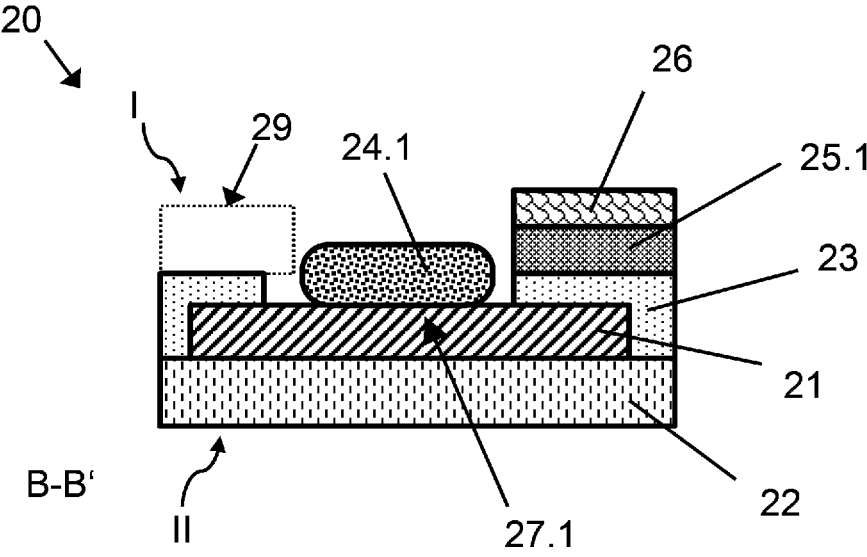
Figure 2A:
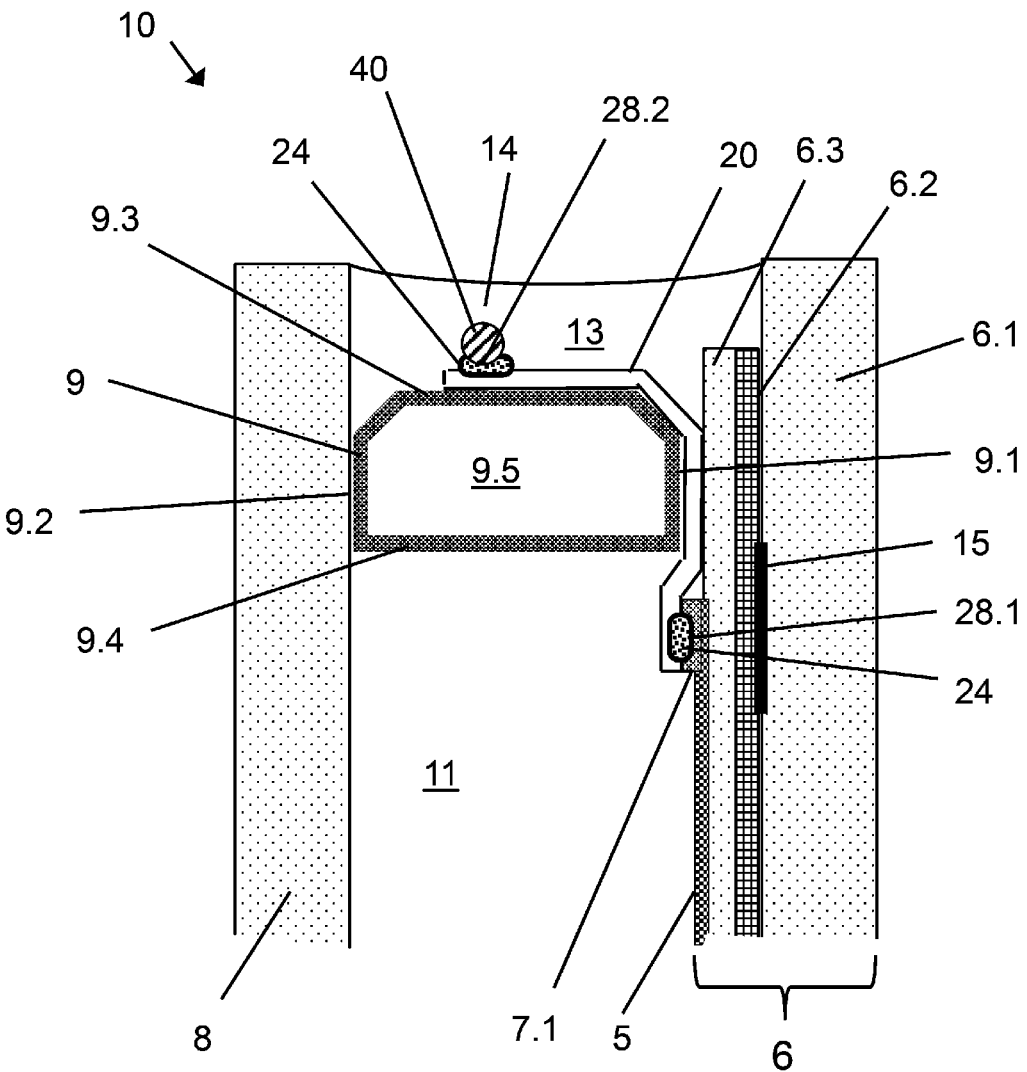
Figure 2B:
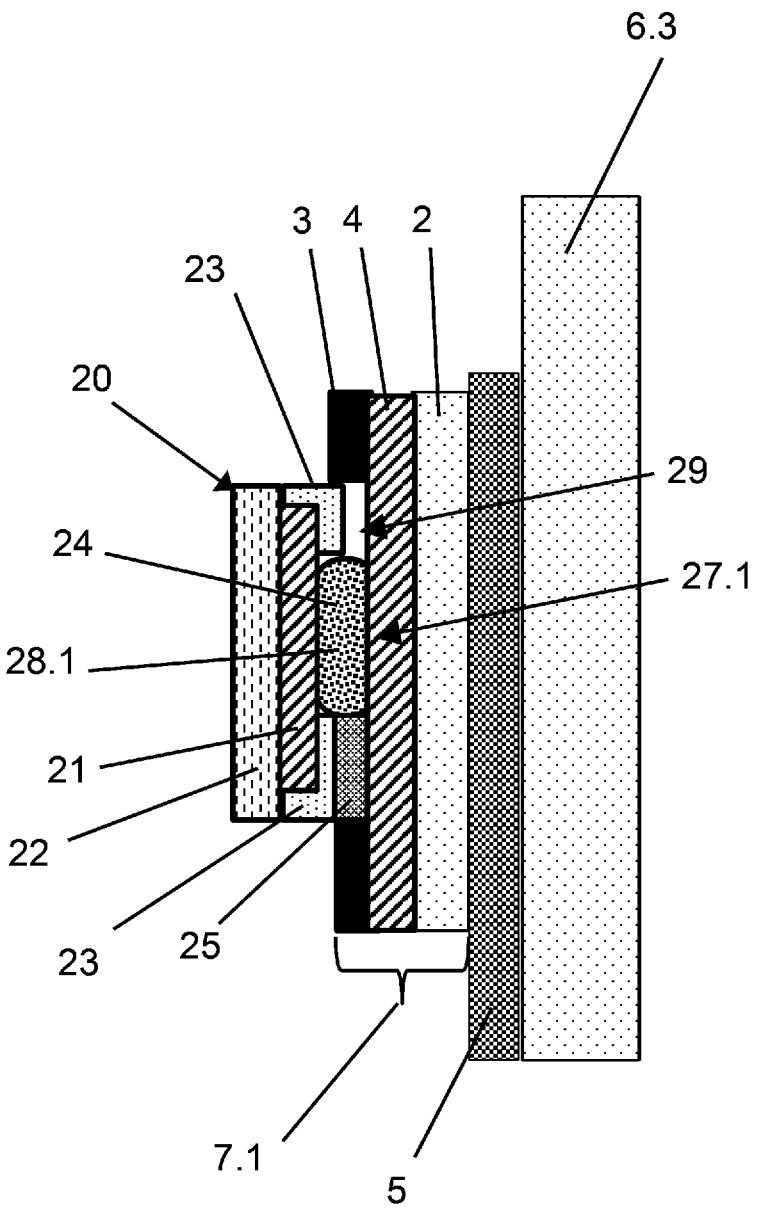
Figure 2C:
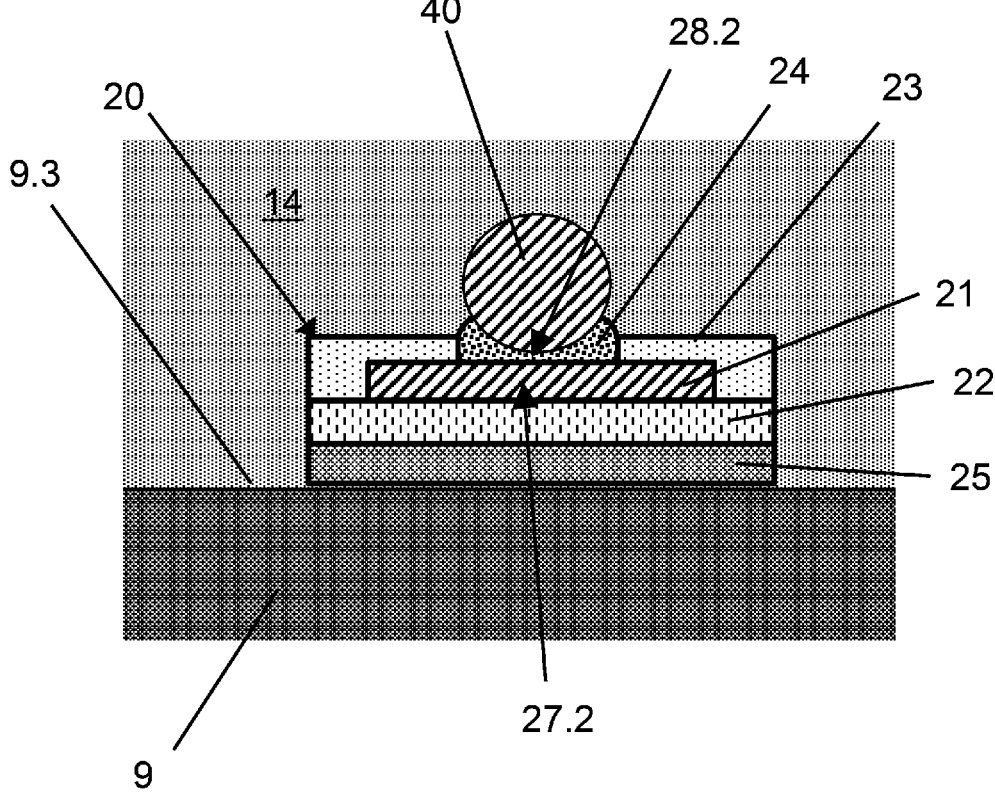
Figure 2D:
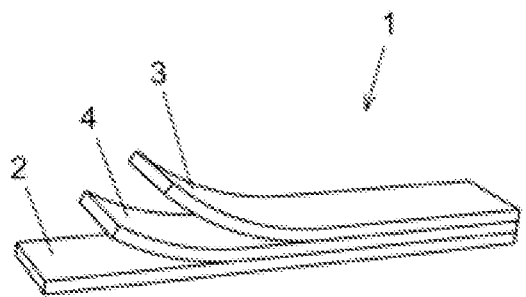
Figure 2E:
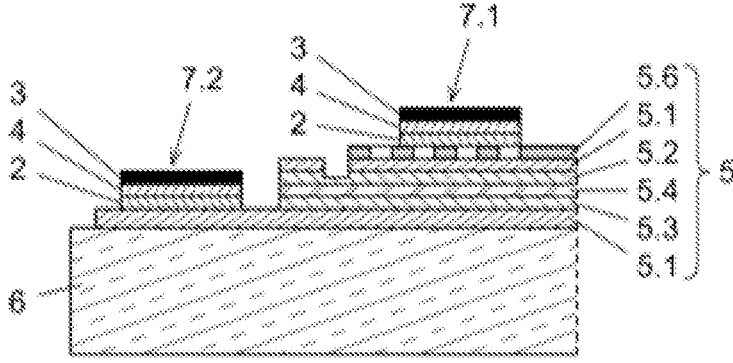
Figure 3A:
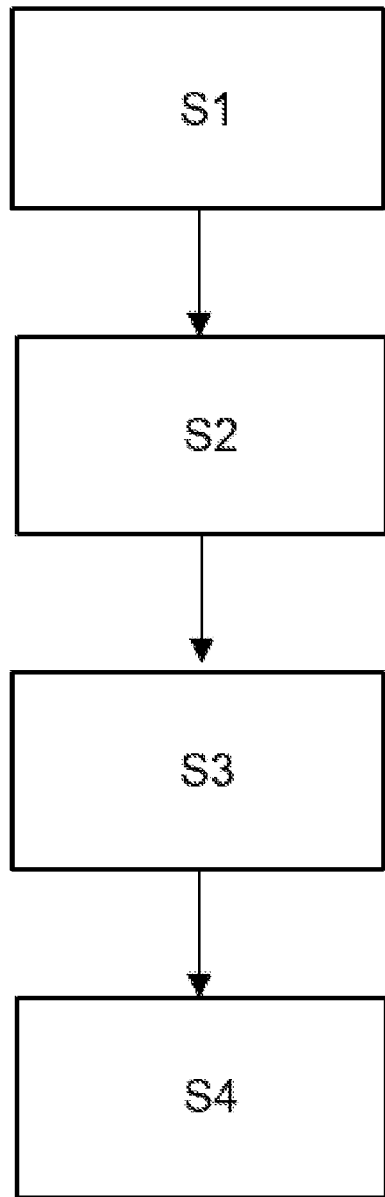
Figure 3B:
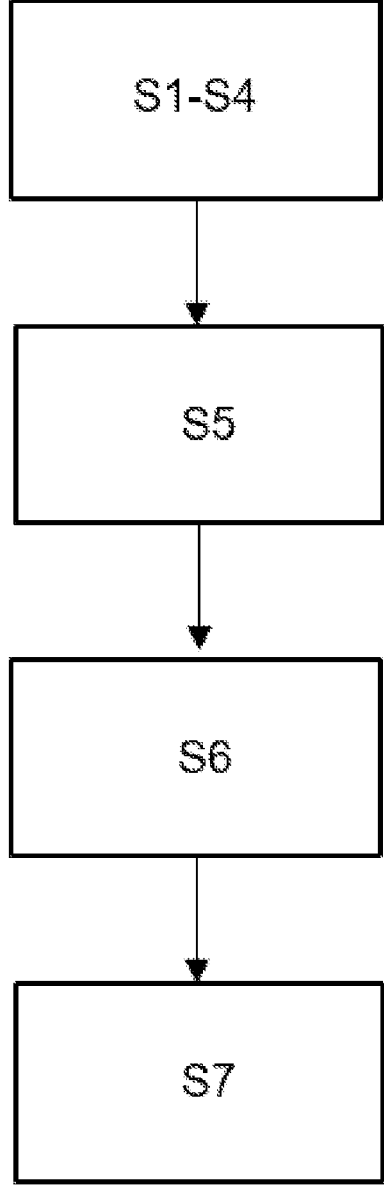
Figure 4A:
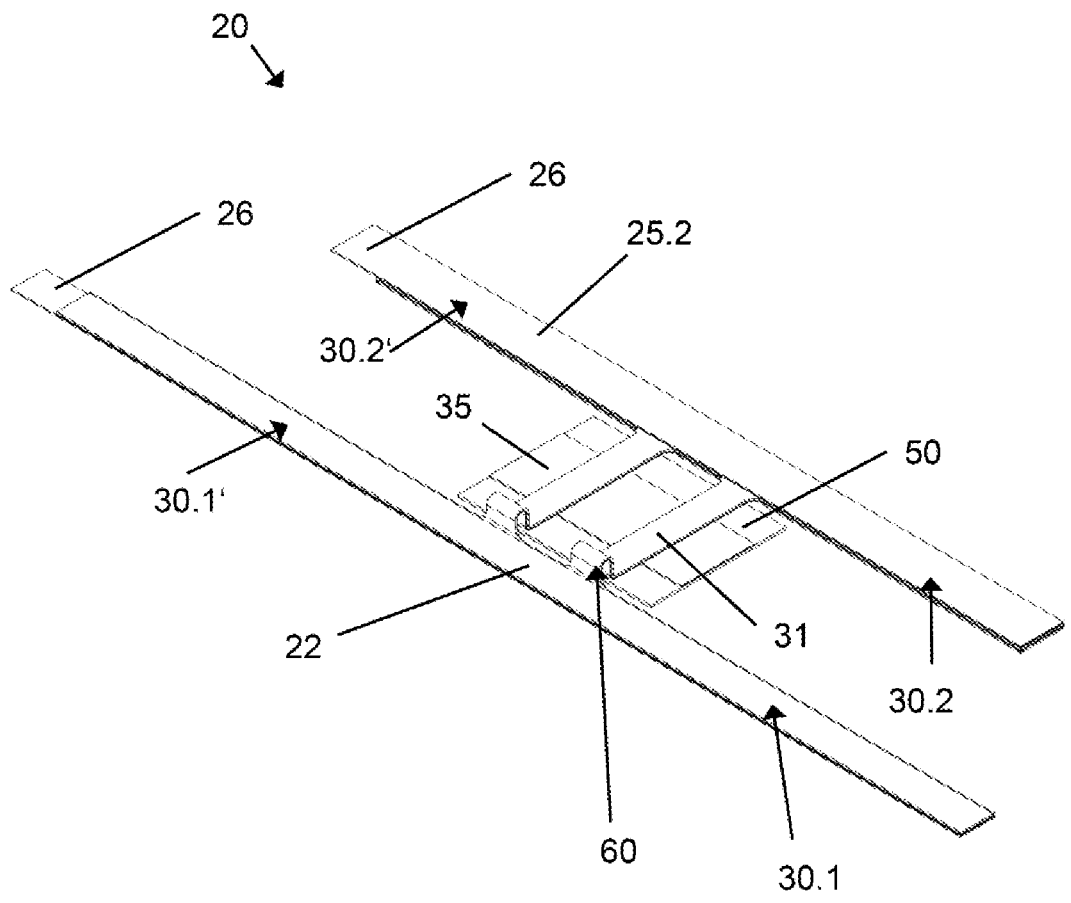
Figure 4B:
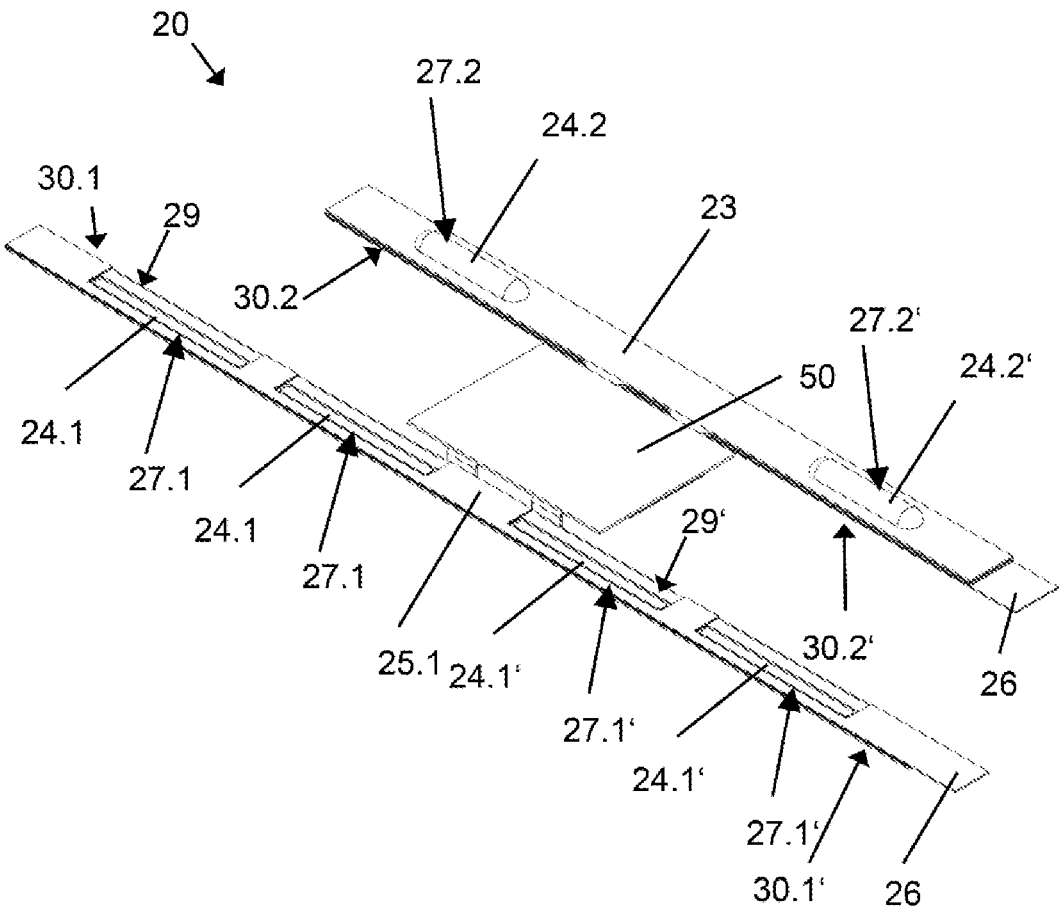

In the following, the invention is explained in more detail in reference to figures and exemplary embodiments. The figures are a schematic representation and are not true to scale. The figures do not limit the invention in any way. Shown are:

FIG. 1A a schematic plan view of the rear side of a connecting element according to the invention, FIG. 1B a schematic plan view of the front side of the connecting element according to the invention from FIG. 1A, FIG. 1C a schematic cross section of the second connection region of the connecting element according to the invention from FIG. 1A along the section line A-A', FIG. 1D a schematic cross section of the first connection region of the connecting element according to the invention from FIG. 1A along the section line B-B', FIG. 2A a detail of an insulated glazing according to the invention in cross section, FIG. 2B an enlarged schematic cross-sectional view of the first connection region according to FIG. 2A, FIG. 2C an enlarged schematic cross-sectional view of the second connection region according to FIG. 2A, FIG. 2D a schematic cross section of an electrically conductive adhesive tape with a covering, FIG. 2E a schematic cross section of an electrically controllable functional element, FIG. 3A a schematic view of a method according to the invention for soldering a connecting element according to the invention, FIG. 3B a schematic view of a method according to the invention for producing an insulated glazing according to the invention, FIG. 4A a perspective view of the rear side of a further connecting element according to the invention, and FIG. 4B a perspective top view of the front side of the connecting element according to the invention from FIG. 4A.

Data with numerical values are generally not to be understood as exact values, but also include a tolerance of +/−1% up to +/−10%.

FIGS. 1A-D show different views and sections of a connecting element according to the invention. FIG. 1A shows a schematic plan view of the second side II of the connecting element 20, i.e., on the side facing away from the solder connections and solder deposits 24.1, 24.1', 24.2, 24.2'. The second side II of the connecting element 20 is therefore also referred to as the rear side or cover side. FIG. 1B shows a schematic plan view of the first side I of the connecting element according to the invention from FIG. 1A, i.e., on the side with the solder deposits 24.1, 24.1', 24.2, 24.2' for forming the solder connections. The first side I of the connecting element 20 is therefore also called the front side or connection side.

FIG. 1C shows a schematic cross section of the second connection region 27.2 of the connecting element 20 according to the invention of FIG. 1A along the section line A-A'. FIG. 1D shows a schematic cross section of the first connection region 27.1 of the connecting element 20 according to the invention from FIG. 1A along the section line B-B'.

The connecting element 20 shown here is suitable, for example, for contacting an electrically conductive coating and/or an electrically controllable functional element such as an electrochromic glazing in an insulated glazing.

The connecting element 20 has an electrically insulating carrier film 22. The carrier film 22 is thin and flexible enough to adapt to the conditions of the substrate, can compensate for small height differences and, in particular, can be curved or bent in the region of the connecting web 31, for example up to 90° from the extension direction.

In the example shown, two flat conductors 21, 21' are arranged on the first side I of the carrier film 22. The flat conductors 21, 21' are electrically insulated from one another, so that the connecting element 20 enables a two-pole connection.

In the example shown, the carrier film 22 has a double-T contour. This means that the carrier film 22 in each case has two strip-shaped leg pairs 30.1, 30.1' and 30.2, 30.2', each of which forms strips, wherein the two strips run parallel to one another. The leg pairs 30.1, 30.1' and 30.2, 30.2' are connected to one another via a centrally and orthogonally extending connection region 31. The connection region 31 here has, for example, an optional rectangular recess, which is arranged between the flat conductors 21, 21'.

A sealing element (not shown here), for example a rectangular strip made of polyisobutylene, can be arranged on one side of the carrier film 22 on the connection region 31. It is understood that, for example, two strips can also be arranged on both sides of the carrier film 22.

The flat conductors 21, 21' are arranged here completely on the carrier film 22. Each of the flat conductors 21, 21' has at its ends a first connection region 27.1, 27.1' and at the opposite end a second connection region 27.2, 27.2'. The first connection region 27.1, 27.1' is electrically conductively connected to the respective second connection region 27.2, 27.2' via flat conductors 21, 21'.

The connection regions are arranged here on the legs of the double-T structure. Thus, the first connection region 27.1 of the flat conductor 21 is located on the leg 30.1, the first connection region 27.1' of the flat conductor 21' on the leg 30.1', the second connection region 27.2 of the flat conductor 21 on the leg 30.2 and the second connection region 27.2' of the flat conductor 21' on the leg 30.2'.

On their first connection regions 27.1, 27.1', the flat conductors 21, 21' each have a first solder deposit 24.1, 24.1', for example. Furthermore, the flat conductors 21, 21' on their second connection regions 27.2, 27.2' likewise each have a second solder deposit 24.2, 24.2', for example. It is understood that one or each flat conductor 21, 21' can also have two or more connection regions and/or two or more solder deposits on their respective connection regions, for example in order to generate redundancy in the contacting and thereby reduce failure rates.

Furthermore, a first adhesive layer 25.1 is arranged on the first legs 30.1, 30.1' on the first side I of the carrier film 22. It is understood that the first adhesive layer 25.1 has at least recesses in the region of the first solder deposits 24.1, 24.1'.

In the example shown, the first adhesive layer 25.1 has two further recesses 29. 29', which extend over the respective flat conductor 21, 21' up to the edge of the carrier film 22.

The recesses 29, 29' have the particular advantage that solder from the solder deposits 24.1, 24.1' can divert into the region of the recess 29, 29' during the soldering process, so that an optimal thickness of the solder connection can be established. Furthermore, outgassings from the solder, the adhesive or the busbar to be soldered can escape and flow off into non-critical regions, in particular in regions which are not visible or minimally visible. This outgassing can be partially very aggressive and destroy the sensitive layers of an electrically conductive coating or an electrically controllable functional element or impair their visual appearance.

Furthermore, the carrier film 22 has a second adhesive layer 25.2 on the legs 30.2, 30.2' on its second side II. In this case, the second adhesive layer 25.2 is arranged covering the second connection regions 27.2, 27.2' on the first side I of the carrier film 22. The connecting element 20 when used can be fastened to a surface, for example an outer surface of a spacer of an insulated glazing, via the second adhesive layer 25.2, thereby making possible a simple soldering of the second connection region 27.2, 27.2'.

The flat conductor 21 consists, for example, of a metal foil, for example a 100 μm thick tin-plated copper film.

The carrier film 22 is, for example, black opaque and electrically insulating. It consists of a polymer film, for example a 150 μm thick polyimide film. The flat conductors 21, 21' are fixedly connected to the carrier film 22, for example by gluing or directly depositing the metal foil on the carrier film 22. The black coloration prevents viewing the flat conductors 21, 21' and reflections on the metallic surfaces thereof and the soldering points along with underlying structures and conceals them.

In the example shown, a cover film 23 is arranged on the first side I of the carrier film 22 and on the flat conductor 21. The cover film 23 is electrically insulating and consists, for example, of a 25 μm thick polyimide film. The cover film 23 is, for example, black and opaque to conceal the viewing of the flat conductors 21, 21' and reflections on the metallic surfaces thereof. It is understood that other colors can also be used, for example, to achieve a particularly aesthetic appearance. In the region of the first adhesive layer 25.1, the cover film 23 is arranged with flat conductors 21, 21' between the adhesive layer 25.1 and the carrier film 22.

In the example shown, the individual legs 30.1, 30.1' of the carrier film 22 have a width of approximately 3 mm in the region of the first connection regions 27.1, 27.1'. The length of the two legs 30.1, 30.1' together is approximately 40 mm. The individual legs 30.2, 30.2' of the carrier film 22 in the region of the second connection regions 27.2, 27.2' have a width of approximately 4 mm. The length of the two legs 30.2, 30.2' together is approximately 60 mm. The length of the connection region 31, i.e., the distance of the legs 30.1, 30.1' from the legs 30.2, 30.2' is approximately 14 mm.

In the example shown, the flat conductors 21, 21' are arranged completely on the carrier film 22, wherein the carrier film 22 has a projection to the flat conductor 21, 21' of approximately 0.5 mm. That is, the flat conductors 21, 21' have a width of approximately 2 mm on the legs 30.1, 30.1' and a width of approximately 3 mm on the legs 30.2, 30.2'.

The solder deposits here are, for example, strip-shaped. The first solder deposits 24.1, 24.1' have, for example, a length of approximately 14 mm (along the extension direction, i.e., along the longitudinal direction of the legs) and a width of approximately 0.8 mm. The second solder deposits 24.2, 24.2' have, for example, a length of approximately 10 mm (along the extension direction, i.e., along the longitudinal direction of the legs) and a width of approximately 2 mm. The solder deposits consist of a solder with a composition of 96.5% Sn/3% Ag/0.5% Cu and a typical soldering temperature of approximately 250° C.

It is understood that the dimensions of the carrier film, in some cases the cover film and the flat conductor, can be adapted to the respective conditions of the respective arrangement. Preferably, the width of the carrier film, and in particular the flat conductor, is matched to the width of the busbars, and in particular the conductor track thereof. The length of the carrier film and the flat conductor can be adapted, for example, to the distance to be bridged between the busbars, and the length of the connection region can be adapted to the distance of the busbars from the outer surface of the spacer in an insulated glazing according to the invention.

In FIGS. 1C and 1D, a protective film 26 is arranged on the adhesive layers 25.1, 25.2. This protective film 26, also referred to as a liner, protects the adhesive layers 25.1, 25.2 before assembly and is removed shortly before the bonding.

FIG. 2A shows a simplified detail of an insulated glazing 10 according to the invention in cross section. The insulated glazing 10 comprises a first pane 6 and a second pane 8, which are connected to one another by a spacer 9. The spacer 9 is attached between the first pane 6 and the second pane 8 arranged parallel thereto. The spacer 9 has a first pane contact surface 9.1, a second pane contact surface 9.2, which runs parallel to the first pane contact surface 9.1, an outer surface 9.3 and a glazing interior surface 9.4. The outer surface 9.3 is connected to the two pane contact surfaces 9.1, 9.2 via an oblique connecting surface. The spacer 9 has a cavity 9.5 in which drying agent can be contained.

A glazing interior space 11 (not shown completely) is defined by the first pane 6, the second pane 8 and the glazing interior surface 9.4 of the spacer 9. The first pane 6 is connected via a sealing means to the first pane contact surface 9.1, and the second pane 8 is connected via a sealing means to the second pane contact surface 9.2. A glazing exterior space 13 is delimited by the first pane 6, the second pane 8 and the outer surface 9.3 of the spacer 9 and is filled with an outer seal 14 in a finished insulated glazing 10.

The first pane 6 has, on the inside surface, for example, an electrochromic functional element 5 (see FIG. 2E and associated description). The functional element 5 extends over almost the entire surface of the inner surface of the first pane 6, minus an edge region of the pane edge of the pane. The functional element 5 is contacted by the first busbar 7.1, which is located in the glazing interior space 11. A detailed view of the busbars 7.1, 7.2 can be found by way of example in FIG. 2D and the associated description.

The first pane 6 contains float glass in the form of a laminated safety glass (VSG). The laminated safety glass has two individual panes (6.1 and 6.3), which are connected to one another via an intermediate layer 6.2. It is preferably a VSG of a 4 mm (or 5 mm) thick pane 6.1, which is connected to a 2.2 mm thick so-called EC pane 6.3 (electrochromic glass). The 4 mm thick pane 6.1 is a float glass.

The EC pane 6.3 is provided on the inside with an opaque coating 15, which is a black screen printing. The opaque coating 15 is applied in a band shape manner and is located approximately in a region at the height from the lower end of the pane to the upper end of the first busbar 7.1. The opaque coating 15 can be approximately 15 mm to 30 mm (from the edge of the glass) wide. The opaque coating 15 restricts the visible region of the insulated glazing and completely conceals the busbar 7.1 when viewed from the outside within a certain viewing angle range.

The spacer is formed from styrene-acrylonitrile (SAN), which is opaque. The distance from the plane of the glazing interior surface 9.4 to the upper end of the busbar 7.1 is approximately 9 mm. The sealant used was, for example, polyisobutylene, and the outer seal 14 used was silicone. The spacer has, for example, a height of approximately 6 mm and a width of approximately 15 mm. The dimensioning is of course adapted to the respective requirements; for example, the width is adapted to the requirements for good thermal insulation.

The busbars 7.1, 7.2 are contacted via a connecting element 20 according to the invention, as is illustrated in FIGS. 1A-D and described in detail. For simplification, only one flat conductor 21 together with connection regions 27.1, 27.2 is shown here. The second flat conductor 21' is concealed here.

In the first connection region 27.1, the connecting element 20 is electrically conductively connected via a soldering point 28.1 to the first busbar 7.1 of the electrochromic pane 6.3.

FIG. 2B shows an enlarged schematic cross-sectional view of the first connection region 27.1 according to FIG. 2A. The opaque covering 3 of the first busbar 3 has been removed here in the region of the solder connection 28.1 before the soldering, for example by laser ablation.

A direct plan view of the solder joint 28.1 from the connection side (i.e., from the left in FIG. 2A or FIG. 2B) through the opaque carrier film 22 is prevented. The view onto the conductor track 4 in the first busbar 7.1 is further prevented by the opaque covering 3. A direct plan view of the solder joint 28.1 is prevented from the disk side (i.e., from the right) through the opaque coating 15. This results in a very inconspicuous appearance of the electrical contacting of the electrochromic pane 6.3 in the insulated glazing 10

In the example shown, the connecting element 20 is guided out of the glazing interior space 11 in the region of the connection region 31 between the spacer 9 and the pane 6.

The connecting element 20 is connected in the second connection region 27.2 to the outer surface 9.3 of the spacer 9 via the second adhesive surface 25.2.

FIG. 2C shows an enlarged schematic cross-sectional view of the second connection region 27.2 according to FIG. 2A. The flat conductor 21 can be connected here to an external control electronics for controlling the electrochromic functional element in the insulated glazing 10 via a solder connection 28.2 with a feed line 40, for example a wire or multi-layered cable.

FIG. 2D shows a schematic cross section of the electrically conductive adhesive tape 1 from which the busbars 7 are produced for contacting the electrochromic pane 6.3. The electrically conductive adhesive tape 1 has an electrically conductive adhesive layer 2. A conductor track 4 is located between the electrically conductive adhesive layer 2 and a covering 3. The covering 3 has, for example, a thickness of approximately 50 µm. The conductor track 4 comprises a strip-shaped layer of copper, which is, for example, tin-plated. The conductor track 4 has, for example, a thickness of approximately 35 µm. The electrically conductive adhesive layer 2 serves to stick the conductor track 4 onto a pane and has a large quantity of electrically conductive material. The electrically conductive adhesive layer 2 has, for example, a thickness of approximately 25 µm. The electrically conductive adhesive tape 1 is flexible. The electrical contact between the first electrode layer 5.1 and the first busbar 7.1 is produced by the electrically conductive adhesive layer 2.

The electrical adhesive layer 2 contains, for example, a heat-activatable adhesive which is bonded at a temperature of 180° C.

FIG. 2E shows a schematic cross section of an electrically controllable functional element 5. The functional element 5 is an electrochromic functional element which is arranged on an inner surface of a first pane 6. The functional element 5 extends almost completely over the inner surface of the first pane 6, minus an edge region from the pane edge of the pane 6. The functional element 5 is electrically contacted by a first busbar 7.1 (also referred to as a bus bar) formed from the adhesive tape 1 and a second busbar 7.2 (bus bar) formed from the adhesive tape 1. The first busbar 7.1 is applied to a first electrode layer 5.1 and the second busbar 7.2 is applied to a second electrode layer 5.1 of the functional element 5.

The electrochromic functional element 5 comprises the two electrode layers 5.1 and two electrochemically active layers 5.2, 5.3 located between the two electrode layers 5.1, which are separated from one another by an electrolyte layer 5.4. The two active layers are in each case capable of reversibly storing ions, wherein at least one of the two layers consists 5.2, 5.3 of an electrochromic material, which has different oxidation states, which states correspond to the loaded or offloaded state of the ions and have a different coloration. By applying an electrical voltage to the two busbars 7.1, 7.2, the loading or offloading of the ions can be controlled in order to thereby control the optical transmission of the functional element 5 in a targeted manner.

In addition, an electrically insulating anti-reflection layer 5.6 can be arranged on the upper electrode layer 5.1. The anti-reflection layer comprises a dielectric material having a refractive index of 1.4 to 1.6. For this purpose, the anti-reflection layer 5.6 has a plurality of recesses in the region of the busbar 7.1, so that the electrode layer 5.1 can be connected to the busbar 7.1 via the electrically conductive adhesive layer 2 or is electrically connected to the busbar. The thickness of the anti-reflection layer is preferably 20 µm to 100 µm. The width of the recesses is sufficient to ensure an electrical contact between the surface electrode 5.1 and the busbar 7.1. Such anti-reflection layers are described by way of example in WO 2019/055306 A1, to which reference is made for the anti-reflection layer and the recesses.

FIG. 3A is a schematic view of the method according to the invention for soldering a connecting element 20 according to the invention with a busbar 7.1, 7.2, wherein (the following method steps S1-S4 are carried out in the order indicated):

S1: two busbars 7.1, 7.2 are each provided with a of a heat-activatable, electrically conductive adhesive layer 2, a conductor track 4 and an opaque, electrically insulating covering 3, S2: the covering 3 of the busbar 7.1, 7.2 is removed in regions to be soldered and portions of the conductor tracks 4 of the busbars 7.1, 7.2 to be soldered are exposed, S3: the first adhesive layer 25.1 of the connecting element 20 is arranged on the busbar 7.1, 7.2 in such a way that the first solder deposits 24.1, 24.1' are located directly above or in contact with the exposed portions of the busbar 7.1.7.2, S4: at least one soldering tip is applied to the second side II of the carrier film 22 substantially congruently with the first solder deposits 24.1, 24.1', and the solder deposits 24.1, 24.1' are heated so that solder connections 28.1, 28.1' are formed between the flat conductors 21, 21' and the busbars 7.1, 7.2.

In the method according to the invention, the soldering tip does not touch the solder directly, but with the interposition of the carrier film 22 and the respective flat conductor 21, 21'.

Preferably, the temperature of the soldering tip is selected such that the adhesive layer 2 of the busbar 7.1, 7.2 is heated below the positions of the solder connection 28.1, 28.1' to a maximum temperature of less than 300° C., preferably less than 250° C. and in particular less than or equal to 230° C. This protects the heat-activatable adhesive of the adhesive layer 2 from damage.

Particularly preferably, a temperature of the soldering tip of less than or equal to 450° C., preferably less than or equal to 410° C., and in particular less than or equal to 350° C. is applied. Due to the heat dissipation through the respective flat conductors 21, 21' and conductor tracks 4, temperatures of the soldering tip in this region lead to suitable maximum temperatures in the adhesive layer 2.

FIG. 3B shows a schematic illustration of the method according to the invention for producing an insulated glazing according to the invention, wherein (the following method steps S1-S7 are carried out in the sequence indicated)

the method steps S1-S4 mentioned under FIG. 3A are carried out,

S5: a spacer 9 is placed on the pane 6, wherein the connection region 31 of the connecting element 20 is arranged between the side face 9.2 of the spacer 9 and the pane 6, S6: the connecting element 20 is glued to the outer surface 9.3 of the spacer 9 via the adhesive layer 25.2 on the second side II of the carrier film 22, and S7: in each case an external supply line 40 is soldered in the respective second connection regions 27.2, 27.2' to the flat conductor 21, 21' of the connecting element 20.

FIG. 4A shows a perspective view of the rear side of a further connecting element 20 according to the invention. FIG. 4B shows a perspective top view of the front side of the connecting element 20 according to the invention from FIG. 4A. The connecting element 20 shown in FIGS. 4A and 4B substantially corresponds to the connecting element 20 according to FIGS. 1A-D, so that only the differences are discussed here and reference is otherwise made to the description relating to FIGS. 1A-D.

The connecting element 20 according to FIGS. 4a and 4B has an electrically insulating carrier film 22. The carrier film 22 is thin and flexible enough to adapt to the conditions of the substrate, can compensate for small height differences and, in particular, can be curved or bent in the region of the connecting web 31, for example up to 90° from the extension direction.

In the example shown, two flat conductors 21, 21' are arranged on the first side I of the carrier film 22. The flat conductors 21, 21' are electrically insulated from one another, so that the connecting element 20 enables a two-pole connection.

In the example shown, the carrier film 22 has a double-T contour. This means that the carrier film 22 each has two strip-shaped leg pairs 30.1, 30.1' and 30.2, 30.2', each of which forms strips, wherein both strips run parallel to one another. The leg pairs 30.1, 30.1' and 30.2, 30.2' are connected to one another via a centrally and orthogonally extending connection region 31. The connection region 31 has here, for example, an optional rectangular recess which is arranged between the flat conductors 21, 21'.

A sealing element 35, for example a rectangular strip of polyisobutylene on one side of the carrier film 22, is arranged here on the connection region 31, for example. It is understood that, for example, two strips can also be arranged on both sides of the carrier film 22. The surface of the sealing element 35 to be bonded is covered with a protective film 50, which, for example, projects beyond the sealing element 35 on two sides. The protective film 50 serves to protect the connecting element 20 from the actual assembly, in particular the packaging of a plurality of connecting elements 20 in a packaging unit or the like. The protective film 50 is typically removed shortly before assembly at the actual place of use.

The flat conductors 21, 21' are arranged here completely on the carrier film 22. Each of the flat conductors 21, 21' respectively has at one end two first connection regions 27.1, 27.1' (i.e., two first connection regions 27.1 for the flat conductor 21 and two first connection regions 27.1' for the flat conductor 21') and at the opposite end a second connection region 27.2, 27.2'.

The connection regions are arranged here on the legs of the double-T structure. Thus, the two first connection regions 27.1 of the flat conductor 21 are located on the leg 30.1, the two first connection regions 27.1' of the flat conductor 21' on the leg 30.1', the second connection region 27.2 of the flat conductor 21 on the leg 30.2 and the second connection region 27.2' of the flat conductor 21' on the leg 30.2'. Consequently, the two first connection regions 27.1 of the flat conductor 21 are electrically conductively connected to the second connection region 27.2. Furthermore, the two first connection regions 27.1' of the flat conductor 21' are electrically conductively connected to the second connection region 27.2'. The flat conductors 21 and 21' are electrically insulated from one another.

The flat conductors 21, 21' each have, on their second connection region 27.2, 27.2', for example, a second solder deposit 24.2, 24.2' (i.e., a total of two solder deposits on the legs 30.2 and 30.2'). Furthermore, the flat conductors 21, 21' also each have a second solder deposit 24.1, 24.1' (i.e., a total of four solder deposits on the legs 30.1 and 30.1' together) on their two first connection regions 27.1, 27.1'. As a result, redundancy in the contacting can be produced, and thus failure rates reduced.

Strain relief devices 60, for example, in the form of U-shaped loops are arranged in carrier film 22, flat conductor 21 and cover film 23 at the transition from the legs 30.1 and 30.1' to the two-part connection region 31.

The surfaces of the first and second adhesive layers 25.1, 25.2 to be bonded are each covered with a protective film 26 which, for example, projects beyond the respective adhesive layer 25.1, 25.2 on one side. The protective film 26 serves to protect the adhesive layers 25.1, 25.2 of the connecting element 20 before the actual assembly, in particular by bonding a plurality of connecting elements 20 in a packaging unit to one another or the like. The protective film 26 is typically removed shortly before assembly at the actual place of use.

LIST OF REFERENCE SIGNS

1 Adhesive tape
2 Adhesive layer
3 Covering
4 Conductor track
5 Functional element
5.1 Electrode layer
5.2 Active layer
5.3 Active layer
5.4 Electrolyte layer
5.6 Anti-reflection layer
6 First pane
6.1 Pane
6.2 Intermediate layer
6.3 EC pane
7.1 First busbar
7.2 Second busbar
8 Second pane
9 Spacer
9.1 First pane contact surface
9.2 Second pane contact surface
9.3 Outer surface of the spacer
9.4 Glazing interior surface of the spacer
9.5 Spacer cavity
10 Insulated glazing
11 Glazing interior space
13 Glazing exterior space
14 Seal 15 Opaque coating
20 Connecting element
21 Flat conductor of the connecting element 20
22 Carrier film
23 Cover film
24.1, 24.1' First solder deposit
24.2, 24.2' Second solder deposit
25.1 First adhesive layer of the connecting element 20
25.2 Second adhesive layer of the connecting element 20
26 Protective film of the adhesive layer 25.1, 25.2
27.1, 27.1' First connection region
27.2, 27.2' Second connection region
28.1, 28.1', 28.2, 28.2' Solder connection
29, 29' Recess
30.1, 30.1', 30.2, 30.2' Leg of the connecting element 20
31 Connection region of the connecting element 20
35 (Optional) sealing element
40 Feed line
50 Protective film
60 Strain relief
I First side, connection side (front side)
II Second side, rear side (cover side)
S1-S7 Method steps

The invention claimed is:

1. An insulated glazing comprising at least one first pane, one second pane and at least one spacer, which has two pane contact surfaces that run parallel to one another, wherein a first pane contact surface is connected to the first pane via a sealing means, and a second pane contact surface is connected to the second pane via a sealing means, so that a glazing interior space and a glazing exterior space are formed, the first pane is provided at least partially with an electrically conductive coating and/or an electrically controllable functional element on the side facing the glazing interior space, and two busbars are provided for electrically contacting the electrical conductive coating and/or the electrically controllable functional element, at least one busbar comprises an electrically conductive adhesive tape, and the electrically conductive adhesive tape comprises an electrically conductive adhesive layer, a conductor track and an opaque, electrically insulating covering, wherein the insulated glazing has a connecting element, which includes at least one flat conductor, which is arranged on a first side of an electrically insulating carrier film, and wherein the at least one flat conductor has at least one first connection region with at least one first solder deposit and at least one second connection region with at least one second solder deposit, at least one second adhesive layer, which is arranged below and/or next to the at least one second connection region on a second side of the electrically insulating carrier film facing away from the first side, the at least one flat conductor of the connecting element is soldered to the at least one busbar in the at least one first connection region, the connecting element between the spacer and the first pane is guided out of the glazing interior space, and the connecting element is connected to an outer surface of the spacer on the side of the electrically insulating carrier film facing away from the at least one second connection region via the second adhesive layer.

2. The insulating glazing according to claim 1, wherein at least one first adhesive layer is arranged around the at least one first connection region on the first side of the electrically insulating carrier film.

3. The insulating glazing according to claim 2, wherein at least one first adhesive layer is arranged at least in portions around the first solder deposit.

4. The insulating glazing according to claim 1, wherein a cover film is arranged at least in portions on the first side of the electrically insulating carrier film and on the at least one flat conductor.

5. The insulating glazing according to claim 4, wherein the cover film is arranged substantially completely on the first side of the electrically insulating carrier film and on the at least one flat conductor.

6. The insulating glazing according to claim 4, wherein at least one first adhesive layer is arranged around the at least one first connection region on the first side of the electrically insulating carrier film, and wherein the cover film and/or the first adhesive layer have, adjacent to the first solder deposit, at least one recess.

7. The insulating glazing according to claim 6, wherein the at least one recess extends up to the edge of the electrically insulating carrier film.

8. The insulating glazing according to claim 4, wherein the electrically insulating carrier film, the cover film and/or the at least one second adhesive layer are opaque and electrically insulating.

9. The insulating glazing according to claim 1, wherein two flat conductors are arranged on a carrier film and the carrier film has a double-T contour, wherein a connection region is arranged on a leg of the double-T contour.

10. The insulating glazing according to claim 1, wherein the electrically insulating carrier film in the at least one first connection region and/or the at least one second connection region is in each case formed as a strip.

11. The insulating glazing according to claim 10, wherein at least one sealing element is arranged on a connection region that connects the strips.

12. The insulating glazing according to claim 1, wherein the at least one flat conductor contains or consists of a metal.

13. The insulating glazing according to claim 1, wherein the connecting element contacts an electrically conductive coating and/or an electrically controllable functional element in an insulated glazing.

14. The insulated glazing according to claim 1, wherein the electrically conductive adhesive tape is connected to the electrically conductive coating and/or the electrically controllable functional element via the electrically conductive adhesive layer.

15. A method for soldering the connecting element of the insulated glazing according to claim 1 with the at least one busbar, the method comprising:

a) providing the at least one busbar with a heat-activatable, electrically conductive adhesive layer, a conductor track and an opaque, electrically insulating covering, b) removing the covering of the busbar in a region to be soldered, and exposing a portion to be soldered of the conductor track of the busbar, c) arranging the first adhesive layer of the connecting element on the busbar in such a way that the first solder deposit is located directly above or in contact with the exposed portion of the busbar, and d) applying at least one soldering tip to the second side of the electrically insulating carrier film substantially congruently to the first solder deposit and heating the solder deposit so that a solder connection is formed between the at least one flat conductor and the busbar.

16. The method according to claim 15, wherein the temperature of the soldering tip is selected such that the adhesive layer of the busbar is heated below the soldering point to a maximum temperature of less than 300° C.

17. The method according to claim 15, wherein a maximum temperature at the soldering element of less than or equal to 450° C.

18. A method for producing an insulated glazing, comprising a) carrying out a method for soldering a connecting element, which includes at least one flat conductor, which is arranged on a first side of an electrically insulating carrier film, wherein the at least one flat conductor has at least one first connection region with at least one first solder deposit and at least one second connection region with at least one second solder deposit, and at least one second adhesive layer, which is arranged below and/or next to the at least one second connection region on a second side of the electrically insulating carrier film facing away from the first side, said carrying out including providing at least one busbar with a heat-activatable, electrically conductive adhesive layer, a conductor track and an opaque, electrically insulating covering, removing the covering of the busbar in a region to be soldered, and exposing a portion to be soldered of the conductor track of the busbar, arranging a first adhesive layer of the connecting element on the busbar in such a way that the first solder deposit is located directly above or in contact with the exposed portion of the busbar, b) placing a spacer on a first pane, wherein the first connection region of the connecting element is arranged between a side face of the spacer and the first pane, c) bonding the connecting element to the outer surface of the spacer via the second adhesive layer on the second side of the electrically insulating carrier film, and d) soldering at least one external supply line in the second connection region to the at least one flat conductor of the connecting element.

* * * * *